(12) United States Patent
Morizane

(10) Patent No.: US 6,497,976 B1
(45) Date of Patent: Dec. 24, 2002

(54) METHOD FOR ELECTROLYTE INJECTION

(75) Inventor: Yuichiro Morizane, Utsunomiya (JP)

(73) Assignee: NEC Mobile Energy Corporation, Tochigi (JP)

( * ) Notice: Subject to any disclaimer, the term of this patent is extended or adjusted under 35 U.S.C. 154(b) by 17 days.

(21) Appl. No.: 09/676,494

(22) Filed: Oct. 2, 2000

(30) Foreign Application Priority Data

Oct. 4, 1999 (JP) ............................................ 11-282707

(51) Int. Cl.$^7$ ................................................. H01M 2/36
(52) U.S. Cl. .............................. 429/71; 429/72; 429/81; 141/59
(58) Field of Search .............................. 429/71, 81, 72; 141/59

(56) References Cited

U.S. PATENT DOCUMENTS 3,354,917 A  * 11/1967 Swanson
5,731,099 A  *  3/1998 Badger et al. ................. 429/72
6,248,138 B1 *  6/2001 Lafave et al. .............. 429/72 X

* cited by examiner

Primary Examiner—John S. Maples
(74) Attorney, Agent, or Firm—Armstrong, Westerman & Hattori, LLP

(57) ABSTRACT

An electrolyte injection method for injecting an electrolyte into a battery case tightly closed except an electrolyte injection hole, said method comprising an electrolyte injection nozzle airtightly mounted on the electrolyte injection hole, exhausting the space inside the battery case with the electrolyte injection nozzle mounted on the electrolyte injection hole, an electrolyte pot connected to the electrolyte injection nozzle via an electrolyte injection valve and for storing the electrolyte to be injected into the battery case, and feeding a given amount of the electrolyte into the electrolyte pot via an electrolyte feeding valve, and injecting the electrolyte in the electrolyte pot under pressure into the battery case, whereby the pressurized gas feeding means is connected to the electrolyte pot via a pressure valve, and the electrolyte is injected by pressurizing the electrolyte after exhausting internal space of the battery case.

2 Claims, 4 Drawing Sheets

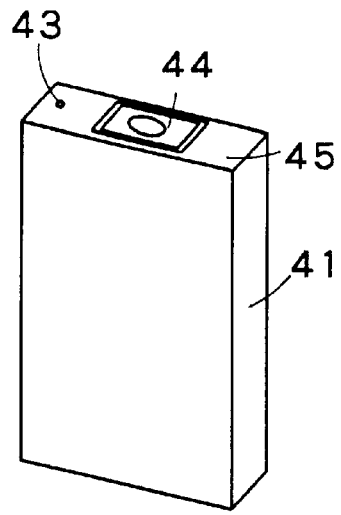
FIG.4(A) PRIOR ART
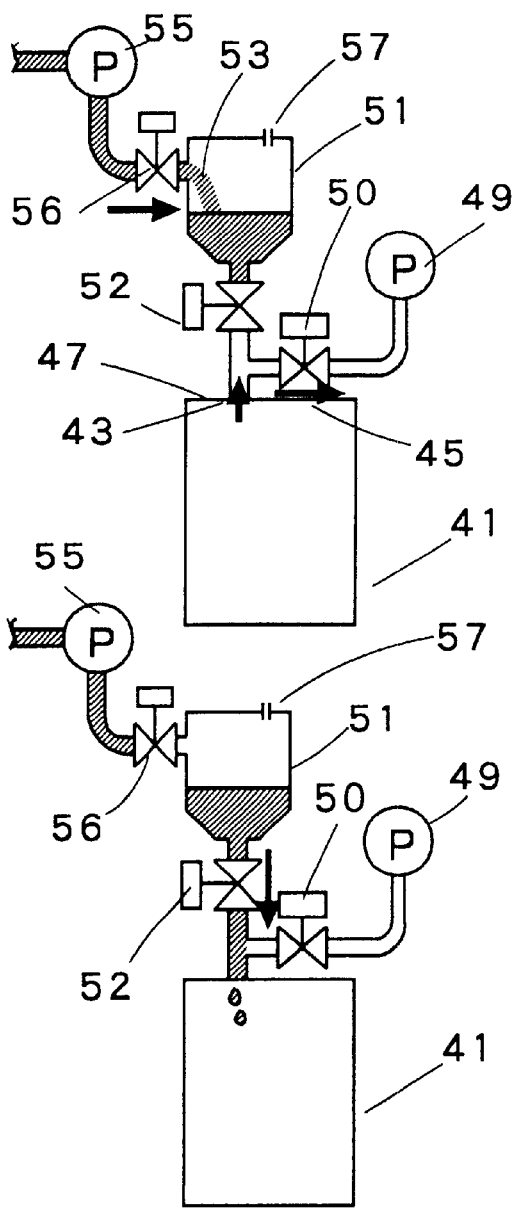
FIG.4(B) PRIOR ART
FIG.4(C) PRIOR ART

METHOD FOR ELECTROLYTE INJECTION

BACKGROUND OF THE INVENTION

The present invention relates to an apparatus and a method for electrolyte injection. The invention relates to an apparatus and a method for efficiently injecting electrolyte through a small hole on a battery case or a top cover after the cover is mounted on the battery case where a battery element is accommodated, and in particular, to an apparatus and a method for injecting electrolyte suitable for injection of electrolyte to a nonaqueous electrolyte battery such as lithium ion battery.

As power source for small size electronic devices, various types of batteries are used. As the power source for the devices such as handy phone, notebook-sized personal computer, cam-corder, etc. nonaqueous electrolyte secondary battery such as lithium ion secondary battery, i.e. small-size large-capacity sealed battery, is used. As the nonaqueous electrolyte battery, cylindrical type and rectangular type batteries are generally used.

The lithium ion battery, used as a power source for small size electronic devices, is produced as follows: Active materials are coated on each of a positive electrode current collector and a negative electrode current collector. The positive electrode and the negative electrode thus produced are laminated with a separator interposed between them, and this is wound up to form a battery element, which is then accommodated in a battery case and sealed.

FIG. 4 shows the drawings to explain assembling process of the battery.

As shown in FIG. 4 (A), the battery element is accommodated in a battery case 41. On an open upper portion of the battery case 41, there are provided an external electrode leading terminal 44, an electrolyte injection hole 43, and a top cover 45 with a pressure release valve to prevent rupture of the battery when the pressure inside the battery is increased, and these are mounted on the battery case by means such as laser welding. As shown in FIG. 4 (B), an injection nozzle 47 of an electrolyte injection apparatus 46 is airtightly retained on the electrolyte injection hole 43 on the top cover 45. Exhaust means 49 of the electrolyte injection apparatus 46 is driven and an exhaust valve 50 is opened. Then, the air in the battery case is drawn out to attain a predetermined degree of reduced pressure. A predetermined amount of electrolyte 53 is then injected to an electrolyte pot 51 via an electrolyte feeding valve 56 by electrolyte feeding means 55. After injecting the predetermined amount of electrolyte, the electrolyte feeding valve 56 is closed.

Next, as shown in FIG. 4 (C), the exhaust valve 50 is closed, and the electrolyte injection valve 52 is opened. Then, the electrolyte in the electrolyte pot 51 is injected into the battery case due to the pressure difference between air pressure in the battery case and the atmospheric pressure applied on a vent hole 57 of the electrolyte pot. After the electrolyte is injected into the battery case, a metal piece is mounted on the electrolyte injection hole, and the injection hole is welded for sealing.

In case of a lithium ion secondary battery, the battery element accommodated in the battery case is produced as follows: A negative electrode material such as carbonaceous material, on which lithium can be doped or undoped, is coated on a band-like current collector and a negative electrode is prepared. A positive electrode material such as lithium transition metal composite oxide, e.g. lithium cobaltate, lithium manganate, etc. is coated on a band-like current collector, and a positive electrode is prepared. These negative and positive electrodes are laminated with a separator interposed between them, and this is wound up to form a battery element.

In the battery case with the battery element accommodated in it, a large number of small voids are formed. Even when the air in the internal space of the battery case has been drawn out, long time is required for completely exhausting the voids. Further, some time is required until the nonaqueous electrolyte is permeated into the battery element, and it is very difficult to inject the electrolyte within short time.

In the method as described above, the driving force for the injection of the electrolyte into the battery case is the pressure difference caused by the reduced pressure, and it does not reach the level of more than one atmospheric pressure.

JP-07099050(A) describes an apparatus, comprising a battery arranged in a chamber and with an electrolyte to be injected into it, and a predetermined amount of electrolyte is filled in an electrolyte reservoir mounted on the injection nozzle. Then, the pressure in the chamber is reduced, and gas such as the air in the electrolyte or the battery element is removed. Then, the pressure is restored to the atmospheric pressure, and pressure is applied again, and the electrolyte is injected.

In this apparatus, however, a funnel-like member with a reservoir corresponding to the amount of the electrolyte to be injected is mounted while the top portion of the battery base with the battery element is opened, and the space inside the battery case is exhausted. A part of the electrolyte is injected into the battery case before exhausting and is permeated into the battery element. As a result, the exhausting from the voids in the battery element is insufficient because of the presence of the electrolyte. Exhausting is performed while the electrolyte is present in the reservoir, which comprises a funnel-like member on the top portion of the battery case, and the pressure is applied as the atmospheric pressure. As a result, air bubbles are generated when the air passes through the funnel-like unit from inside the battery case, and these air bubbles are sent into the battery.

Also, this apparatus is applied to the battery assembling process to inject the electrolyte before the top cover is mounted on the top portion of the battery case. This cannot be applied to the method, in which the electrolyte with higher viscosity is injected through small electrolyte injection hole of less than 1 mm in diameter of a small rectangular type battery as arranged on the top cover on the open upper portion of the battery case.

It is an object of the present invention to provide an electrolyte injection apparatus, by which it is possible to quickly fill the electrolyte to all corners inside the battery case. It is another object of the present invention to provide an apparatus and a method for injecting the electrolyte, by which the electrolyte can be easily injected even in case of a small size rectangular battery.

SUMMARY OF THE INVENTION

The present invention provides an electrolyte injection apparatus for injecting an electrolyte into a battery case tightly closed except an electrolyte injection hole, said apparatus comprising an electrolyte injection nozzle airtightly mounted on the electrolyte injection hole, exhaust means for exhausting the space inside the battery case with the electrolyte injection nozzle mounted on the electrolyte injection hole, an electrolyte pot connected to the electrolyte injection nozzle via an electrolyte injection valve and for storing the electrolyte to be injected into the battery case, and electrolyte feeding means for feeding a given amount of the electrolyte into the electrolyte pot via an electrolyte feeding valve, and pressurized gas feeding means for injecting the electrolyte in the electrolyte pot under pressure into the battery case.

Also, the present invention provides the electrolyte injection apparatus as described above, wherein there is provided pressurizing means for preventing deformation of the battery case by applying pressure on wall surfaces of the battery case when the pressurized gas is fed to the electrolyte pot via the pressure valve from the pressurized gas feeding means.

Further, the present invention provides an electrolyte injection method for injecting electrolyte into a battery case tightly closed except an electrolyte injection hole, said method comprising the steps of exhausting internal space of the battery case to a predetermined degree of reduced pressure, storing a predetermined amount of electrolyte in an electrolyte pot, feeding a pressurized gas into the electrolyte pot at the same time or after the starting of the injection of the electrolyte of the electrolyte pot into the battery case, and injecting the electrolyte under pressure into the battery case.

Also, the present invention provides the electrolyte injection method as described above, wherein deformation of the battery case is prevented by applying pressure on wall surfaces of the battery case when the electrolyte is fed under pressure by the pressurized gas.

BRIEF DESCRIPTION OF THE DRAWINGS

FIGS. 4A–4C shows drawings to explain assembling process of a battery.

DETAILED DESCRIPTION OF THE PREFERRED EMBODIMENT

Figure 1:
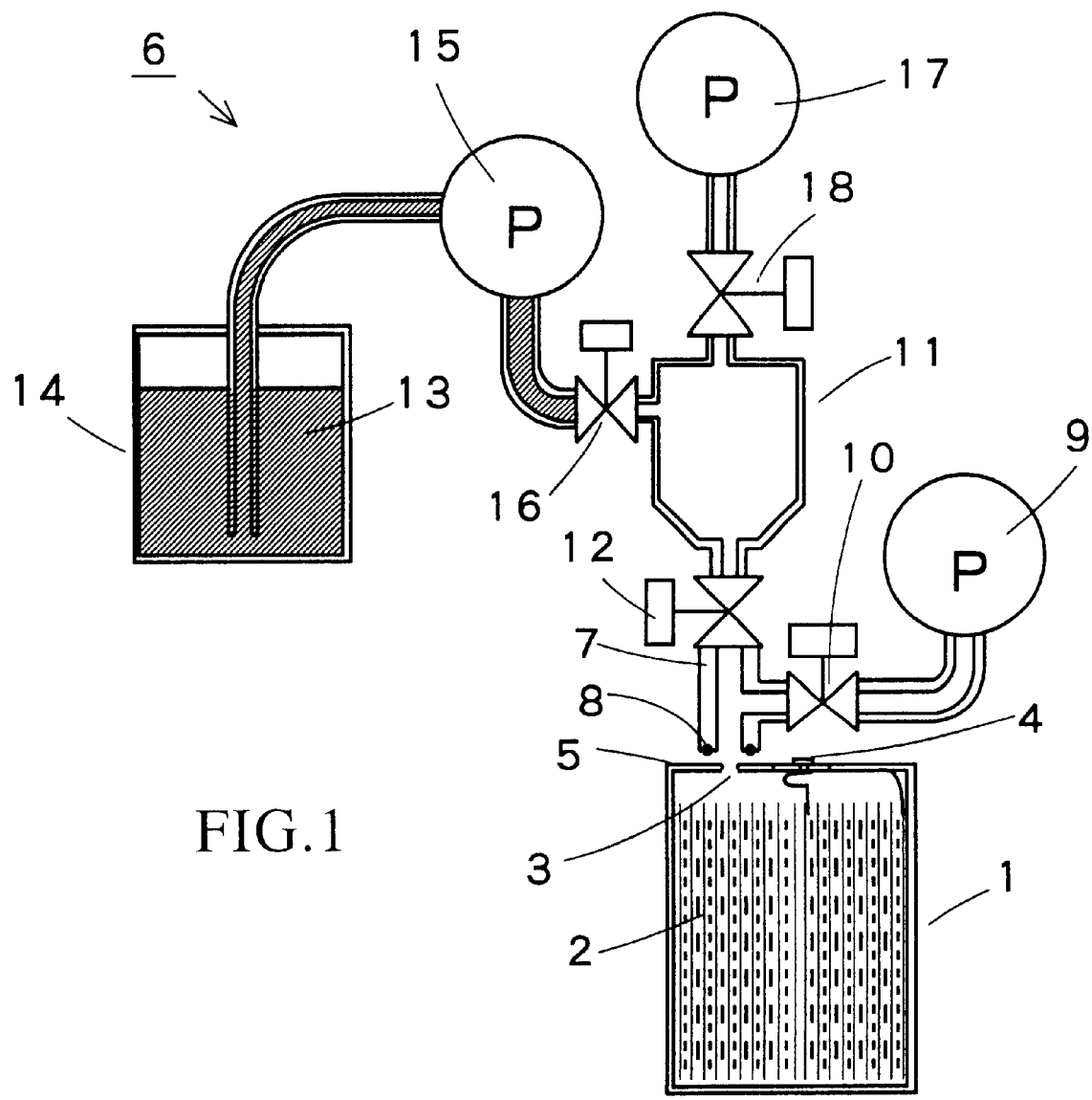
FIG. 1 is a drawing to explain an electrolyte injection apparatus according to the present invention.

According to the present invention, after the air remaining in a battery case has been removed by air exhausting, an electrolyte is supplied under pressure into a battery case. As a result, the electrolyte can be quickly injected through a small injection hole for the electrolyte.

Detailed description will be given below on the present invention referring to the drawings.

FIG. 1 is a drawing to explain an electrolyte injection apparatus of the present invention.

A battery element 2 is accommodated in a battery case 1. On an open upper portion of the battery case 1, there are provided an electrolyte injection hole 3, an external electrode leading terminal 4, and a top cover 5 with a pressure release valve to prevent rupture of the battery when pressure inside the battery is increased, and these are attached on the battery case 1 by means such as laser welding. An injection nozzle 7 of an electrolyte injection apparatus 6 is mounted on the electrolyte injection hole 3. The injection nozzle 7 is provided with airtightness maintaining means such as O-ring 8 so that airtightness is maintained when it is pressed against wall surfaces of the top cover.

The electrolyte injection apparatus comprises exhaust means 9 for exhausting the space in the battery case, and an exhaust valve 10, which connects the injection nozzle 7 with the exhaust means 9.

An electrolyte pot 11 for accommodating a predetermined amount of electrolyte is connected to the injection nozzle 7 via an electrolyte injection valve 12. Electrolyte feeding means 15 connected with storage means 14 of an electrolyte 13 is coupled to the electrolyte pot 11 via an electrolyte feeding valve 16.

Pressurized gas feeding means 17 is connected to the electrolyte pot 11 via a pressure valve 18.

FIG. 2 shows drawings to sequentially explain operation of the electrolyte injection apparatus of the present invention.

Figure 2A:
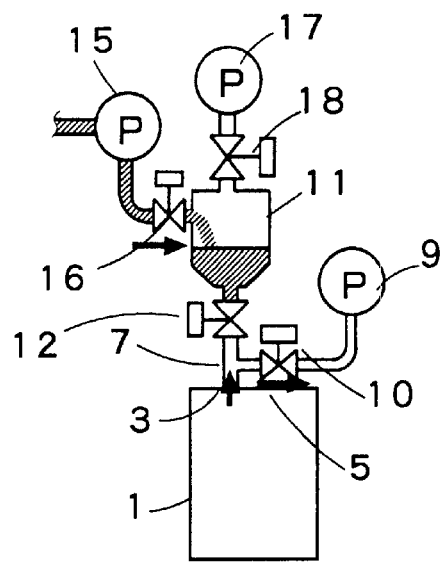
FIGS. 2A–2C represents drawings to explain operation of an electrolyte injection apparatus of the present invention.

As shown in FIG. 2(A), the battery element is accommodated in the battery case, and a top cover 5 with the electrolyte injection hole 3 is mounted on the open upper portion of the battery case 1 by means such as laser welding. The injection nozzle 7 of the electrolyte injection apparatus 6 is airtightly attached to the electrolyte injection hole 3. Next, the exhaust means 9 is operated, and the exhaust valve 10 connecting the injection nozzle 7 with the exhaust means 9 is opened, and the air in the battery case is drawn out. From the electrolyte feeding means 15, a given amount of electrolyte corresponding to the battery volume is injected to the electrolyte pot 11.

Figure 2B:
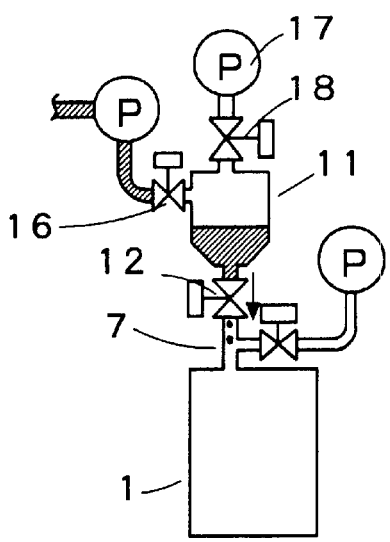

Next, as shown in FIG. 2(B), the exhaust valve 10 and the electrolyte feeding valve 16 are closed, and the electrolyte injection valve 12 is opened. Because the pressure inside the battery case is reduced, the injection of the electrolyte into the battery case is started due to the difference of the pressure between the space inside the battery case and the electrolyte pot 11.

Figure 2C:
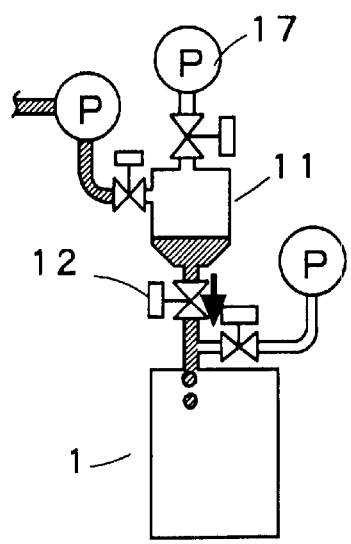

When the injection of the electrolyte of the electrolyte pot 11 is started, as shown in FIG. 2(C), the pressure valve connected to the pressurized gas feeding means 17 is opened. Pressure is applied on the electrolyte in the electrolyte pot 11, and the electrolyte can be quickly injected into the battery case.

In the electrolyte injection apparatus of the present invention, pressure is applied inside the battery case when the electrolyte is injected into the battery case. Depending on size, type, etc. of the battery case, wall surfaces of the battery case may be swollen or deformed. In this respect, it is preferable that the deformation of the battery case caused by swelling is suppressed when the pressure is applied inside the battery case.

In the above, description has been given on the method to inject the electrolyte of the electrolyte pot under pressure after injecting a given amount of electrolyte into the electrolyte pot. If pressurized feeding means for feeding a given amount of electrolyte under pressure is used, it is possible to directly inject the electrolyte under pressure without using the electrolyte pot.

Figure 3:
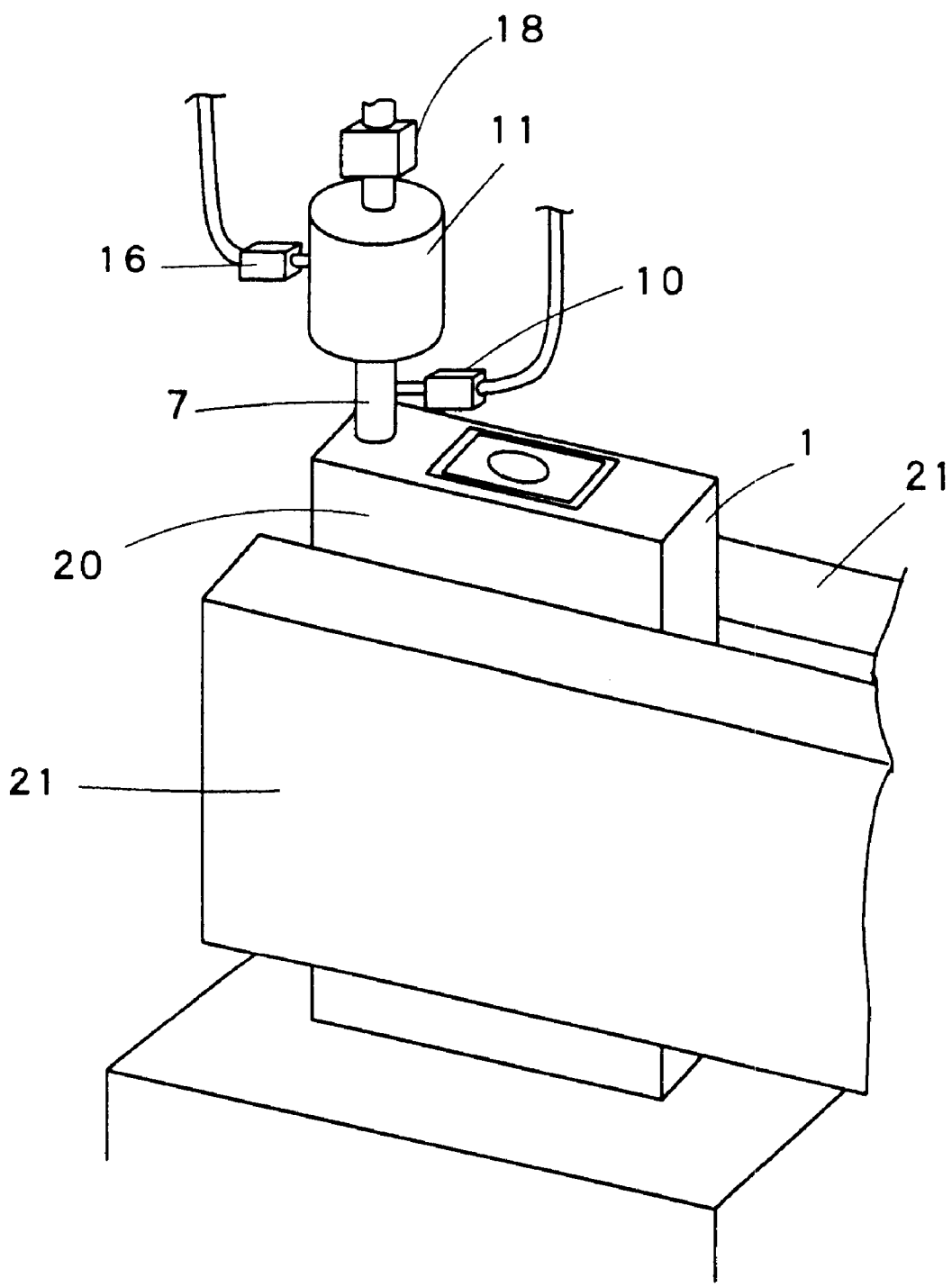
FIG. 3 is a perspective view to explain means for preventing deformation of the battery case.

FIG. 3 is a perspective view to explain means for preventing deformation of the battery case.

After the injection of the electrolyte through the electrolyte injection nozzle 7 has been started, the pressure valve 18 is opened, and pressure is applied on the electrolyte in the electrolyte pot 11. Then, wall surfaces 21 of the battery case are pressurized from both sides by pressurizing means 20, and deformation of the wall surfaces 21 of the battery case 1 is prevented.

The pressure applied on the wall surfaces of the battery case is a pressure corresponding to the pressure of the electrolyte to be injected into the battery case, and it is preferable to apply pressure equal to the pressurizing force.

Operating conditions of the electrolyte injection apparatus of the present invention can be set as desired according to type of battery active material, shape and structure of the battery, etc. When the air in the battery case is drawn out and the pressure is reduced to lower than 8–10 Torr within 5–7 seconds, the condition is maintained for about 2 seconds. After confirming that the degree of vacuum is stable and there is no leakage, the exhaust valve is closed, and the injection of the electrolyte is started. After 4–10 seconds from the initiation of the injection of the electrolyte, the pressure valve is opened to apply pressure.

As the gas to be used for pressurizing the electrolyte, any type of gas may be used so far as it does not react with or deteriorate the electrolyte. It is preferable to pressurize using nitrogen or carbon dioxide, which is completely free of moisture. Pressuring force may be 0.8–2 $kgf/cm^2$.

According to the method of the present invention, electrolyte can be injected in 60 seconds through the electrolyte injection hole of 1 mm in diameter into a battery of 48×30×6 mm (height×length×width).

In the electrolyte injection apparatus of the present invention, the electrolyte is stored in the electrolyte pot while the space inside the battery case is being exhausted, and the electrolyte is pressurized by the pressurizing means and is injected into the battery case. As a result, even through a small electrolyte injection hole on the battery case, the electrolyte can be injected within short time.

What is claimed is:

1. An electrolyte injection method for injecting electrolyte into a battery case tightly closed except an electrolyte injection hole, said method comprising the steps of exhausting internal space of the battery case to a predetermined degree of reduced pressure, storing a predetermined amount of electrolyte in an electrolyte pot, feeding a pressurized gas into the electrolyte pot at the same time or after the starting of the injection of the electrolyte of the electrolyte pot into the battery case, and injecting the electrolyte under pressure into the battery case.

2. An electrolyte injection method according to claim 1, wherein deformation of the battery case is prevented by applying pressure on wall surfaces of the battery case when the electrolyte is fed under pressure by the pressurized gas.

* * * * *